United States Patent [19]

Newell

[11] Patent Number: 4,667,434

[45] Date of Patent: May 26, 1987

[54] SCORPION LURE

[76] Inventor: Douglas P. Newell, c/o Police Station, Tenterfield 2372 N.S.W., Australia

[21] Appl. No.: 789,056

[22] Filed: Oct. 18, 1985

[51] Int. Cl.$^4$ ............................................. A01K 85/00
[52] U.S. Cl. ................... 43/42.47; 43/42.45; 43/42.48
[58] Field of Search ............... 43/42.45, 42.47, 42.48

[56] References Cited

U.S. PATENT DOCUMENTS

| | | | |
|---|---|---|---|
| D. 56,707 | 11/1920 | Nash | 43/42.45 X |
| D. 254,026 | 1/1980 | Parker | D22/28 |
| 1,334,249 | 3/1920 | Lane | 43/42.22 X |
| 2,241,767 | 5/1941 | Cullerton | 43/42.48 X |
| 2,245,061 | 6/1941 | Wisniewski | 43/42.47 X |
| 2,583,616 | 1/1952 | Waddell | 43/42.48 |
| 2,703,946 | 3/1955 | Davis | 43/42.47 X |
| 2,789,386 | 4/1957 | Creelman | 43/42.22 X |
| 2,944,363 | 7/1960 | Poe | 43/42.22 |
| 2,957,265 | 10/1960 | Hunt | 43/42.47 |
| 3,456,378 | 7/1969 | Adams | 43/42.48 |
| 3,541,718 | 11/1970 | Norman | 43/42.47 X |
| 3,641,698 | 2/1972 | Varaney | 43/42.48 |
| 3,874,109 | 4/1975 | Peterson | 43/42.22 |
| 3,877,168 | 4/1975 | Stevens | 43/42.47 X |
| 4,052,809 | 10/1977 | Reinhardt | 43/42.22 |
| 4,155,191 | 5/1979 | Spivey | 43/42.22 |
| 4,245,421 | 1/1981 | Phillips | 43/42.47 |
| 4,437,257 | 3/1984 | Kluge | 43/42.47 X |
| 4,445,294 | 5/1984 | Gowing | 43/42.47 |

Primary Examiner—Nicholas P. Godici
Assistant Examiner—Carmine Cuda
Attorney, Agent, or Firm—Pravel, Gambrell, Hewitt & Kimball

[57] ABSTRACT

A fishing lure adapted to be towed at high speeds through the water having an elongated tubular body with a V-shaped downwardly extending arcuate surface in the rear portion of the belly, a rounded arcuate surface in the front portion of the belly and a tuck in the mid portion of the belly combined with a top back portion forming a curved arc which extends upwardly between two end portions of the body. A towing cleat and diving cleat are affixed to the lure below a center drafting line extending between pointed front and rear ends of the lure. Hydrodynamic resistance resulting from these surfaces causes the lure to move in a lateral rolling action, a short side-to-side darting action and a body oscillation which serves to attract fish.

13 Claims, 5 Drawing Figures

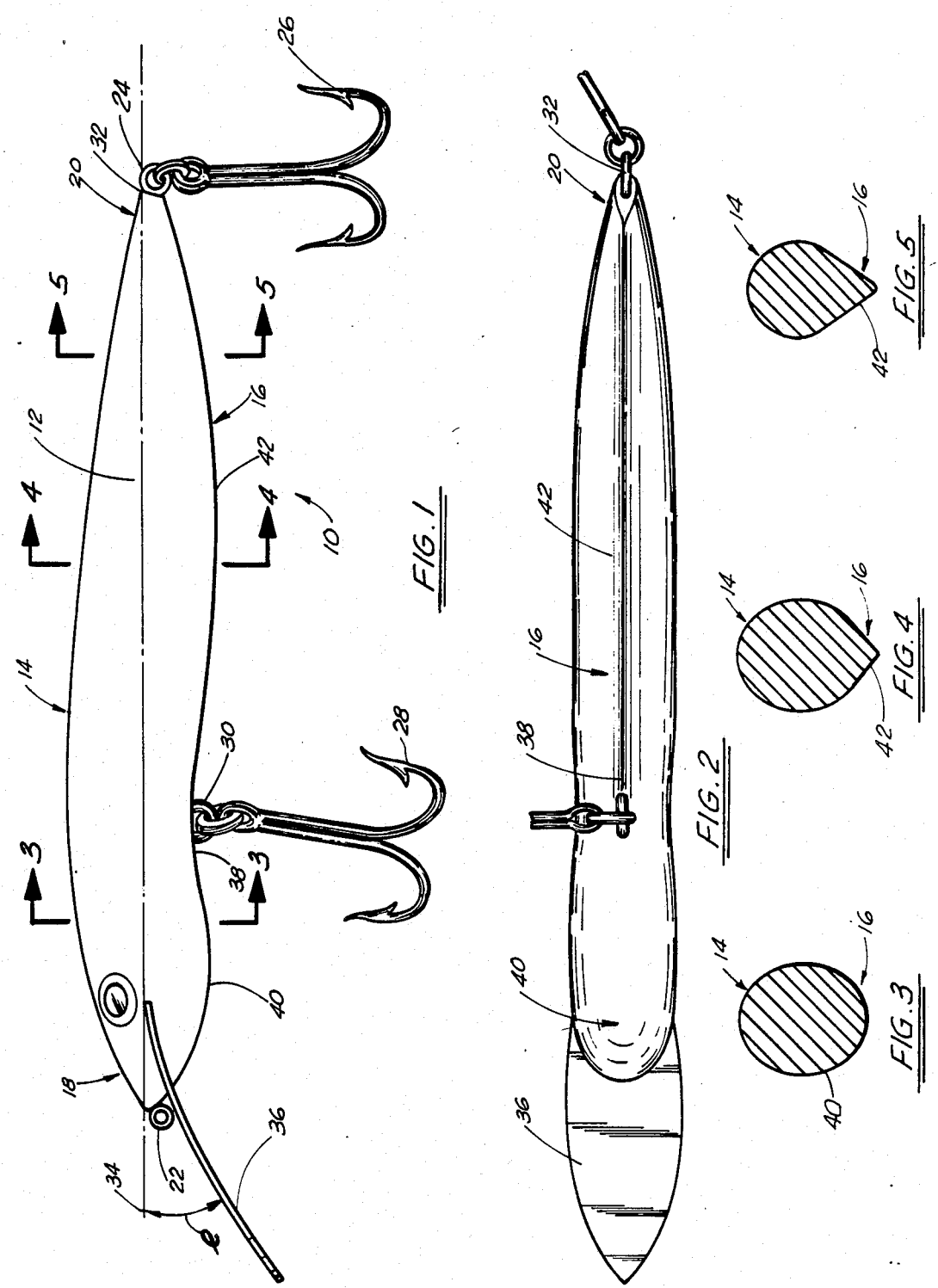

SCORPION LURE

BACKGROUND OF THE INVENTION

1. Field of the Invention

This invention relates to fishing lures and, more particularly, to a lure of novel shape which allows it to be pulled through the water at speeds in excess of 10 knots at fishing depth without uncontrolled roll. The shape allows the lure to follow a wave-like path through the water and oscillate within that path in a fish-exciting manner.

Man has used artificial lures since the dawn of time to attract fish. Over that period numerous variations of lures have been designed which attempt to approximate the natural motion of bait fish on which the fish might normally feed. For example, see U.S. Pat. No. 2,245,061 to Wisniewski, U.S. Pat. No. 2,583,616 to Waddell, U.S. Pat. No. 3,456,378 to Adams, and U.S. Pat. No. 3,641,698 to Varaney.

It is known that larger faster fish prefer bait which can be pulled through the water at high speeds. Unfortunately, existing lures cannot be trolled at speeds in excess of 4 to 5 knots without popping to the surface or without the addition of weight which severely dampens their action. Furthermore, at higher speeds these lures follow erratic and uncontrolled paths which do not approximate bait fish. Indeed, the actions of existing lures, especially at speeds above 5 knots, serve to frighten rather than attract fish.

SUMMARY OF THE INVENTION

After years of development, these problems have been solved by providing a lure of unique shape which offers a high degree of stability and controlled oscillation when pulled through the water. The lure can be trolled at speeds in excess of 10 knots with stability without surfacing. The instant invention further follows a natural bait fish swimming pattern with an enchanced fish-exciting oscillation approximating a frightened fish which serves to attract fish.

The invention provides a lure in which the nose cleat and diving plate are set below the mid-point of a frontal cross-section of the lure. The rear belly portion of the lure has a V-shape which acts as a rudder in contrast to the rounded front belly portion of the lure. A tuck or indentation in the lower belly portion of the lure in combination with the curved back portion of the lure causes the lure to ride through the water in a nose high position allowing the rear V-shaped portion better rudder like control. All of these features stabilize the overall path which the lure follows through the water and reduces side-to-side roll. These features further cause the lure to oscillate in the water and make noise which entices fish into striking.

Accordingly, it is an object of this invention to provide a lure which can be pulled through the water at high speed without rising to the surface. It is an object of this invention to provide a lure which is stable and has a tight wobble causing a fish-exciting sound and action as it is pulled through the water. It is a further object of this invention to provide a lure which tracks well at higher retrieval speeds in order to facilitate the trolling of several lures in close proximity.

BRIEF DESCRIPTION OF THE DRAWINGS

For a further understanding of the nature and objects of the present invention, reference should be had to the following detailed description, taken in conjunction with the accompanying drawings in which the parts are given like reference numerals and wherein:

FIG. 1 is a side view of the lure of the instant invention;

FIG. 2 is a bottom view of the lure of FIG. 1;

FIG. 3 is cross-section of the forward rounded portion of the lure;

FIG. 4 is the cross-section of the lure illustrating the V-shaped rudder-like belly portion of the lure; and FIG. 5 is the cross-section of the rear portion of the lure, again illustrating the V-shaped belly portion of the lure.

DETAILED DESCRIPTION OF THE PREFERRED EMBODIMENT

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limited sense.

FIG. 1 illustrates the preferred embodiment of a seven (7") inch lure of the instant invention. The lure 10 is comprised of a body 12 which has a top back portion 14, a bottom belly portion 16, a front head portion 18 and rear tail portion 20. A front cleat 22 is attached to the front tip of the front head portion 18 in order to accommodate a fishing line, a rear cleat 24 is attached to the rear tail portion to accommodate rear treble hook 26, and a forward treble hook 28 is attached to a center cleat 30 affixed to the bottom belly portion of the body 12. Note that the rear tail portion 20 of body 12 converges to a point 32.

For reference purposes a line between the front cleat 22 and the point 32 formed by the rear tail portion 20 will be referred to as a center drafting line 34. A diving cleat 36 is connected to the front head portion 18 of body 12 at a point below the center drafting line 34 by means well known in the art. Diving plate 36 is preferably made of metal so that it can be bent. Bending the diving plate 36 up or down causes the lure to descend to different depths and changes the action of the lure in the water. Front cleat 22, rear cleat 24 and center cleat 30 are also metal and preferably connected by wire (not shown) within the body 12 of the lure for added strength.

The curves and proportions of lure 10 are important to its action. The top back portion 14 forms a curved arc which extends upwardly between the end portions 18, 20. Note that the apex of that curve vertically coincides with an indentation or a tuck 38 in the bottom belly portion 16 of body 12. Further note that the bottom belly portion 16 of body 12 has two (2) protruding curves 40, 42 along its length. Curve 40 extends generally from front cleat 22 to tuck 38. Rear curve 42 extends generally from tuck 38 to rear cleat 24. Tuck 38 is formed at the intersection of curve 40, 42 and itself may consists of an upwardly extending curve. The radius of curve 40 is smaller than the radius of curve 42 which is in turn smaller than the radius of the curve in the top back portion 14.

The diving plate extends outward from the head portion 18 in a direction generally parallel to an imaginary extention (not shown) of the curve of top back portion 14. In practice, it may be advantageous to increase the angle between the diving plate 36 and center drafting line 34. Generally the angle should be in excess of 20°.

The curvature of the body 12 in cross-section as depicted in FIGS. 3, 4 and 5 compliment curves 40, and 42. The curvature of the top back portion 14 is generally rounded. However, note that the bottom belly portion 16 in the area of curve 40 is rounded in cross-section, FIG. 3; but that the bottom belly portion in the area of curve 42 is pointed in cross-section, FIGS. 4 and 5. The rounded bottom belly portion depicted in the cross-section of FIG. 3 presents a broad surface of hydraulic contact and greater resistance to hydraulic flow to forward movement. In contrast, the more pointed cross-sections of FIGS. 4 and 5 present narrowed surfaces and less resistance to hydraulic flow and cause the curve 42 to act as a rudder. This stabilizes the lure and significantly reduces any sideways rolling of the lure during high speed trolling. The combination of the rounded and V-shaped surfaces of the bottom belly portion 16 and their consequent high and low hydraulic resistance cause the lure to assume an angled attitude as it is pulled through the water. This increases the rudder action of the pointed V-shaped surfaces. Stabilized motion allows the lure to vibrate at higher frequencies as it passes through the water in order to simulate frightened or startled fish.

Curves 14 and tuck 38 interact with dividing plate 36 to cause the lure to follow a wave-like path through the water. The curve of top back portion 14 and tuck 38 further combine to cause the lure to tow in a position such that the center drafting line 34 is slightly angled above the line of forward progress of the lure 10. This causes the bottom belly portion 16 about curve 42 to drop slightly lower than the forward head portion of body 12 during trolling thus allowing more effective rudder action of the pointed cross-section 46.

FIG. 2 illustrates a bottom view in FIG. 1. FIG. 2 illustrates that the width of diving plate 36 is approximately the width of the body 12 of lure 10.

Treble hooks 26, 28 are used in the preferred embodiment and are placed at the tuck 38 and rear cleat 24. However, the front treble hook 28 may be moved one-half ($\frac{1}{2}$") to three-quarters ($\frac{3}{4}$") of an inch forward or rearward from tuck 38 in order to accommodate larger or smaller sizes of the lure and larger or smaller hook sizes. Generally, moving front hook 28 forward prevents it from becoming tangled in rear treble hook 26 on smaller lure sizes.

The general relationship of the length of the lure and the proportions of the curves is important. In a cross-section of the lure in the area of tuck 38, two-thirds ($\frac{2}{3}$) of the area of the cross-section of the lure should be above the center drafting line and one-third ($\frac{1}{3}$) of the area of the cross-section of the lure should be below the drafting line. The length of the body 12 forward of the tuck should generally be one-third ($\frac{1}{3}$) of the length of the lure. Curve 42 extends approximately two-thirds ($\frac{2}{3}$) of the length of the bottom belly portion 16. The diving plate 36 should be between 20 and 25 percent of the length of body 12.

It should be kept in mind that within the general proportions given this lure may be made in various sizes to accommodate the fishing conditions. The lure depicted in FIG. 1 has an elongated tubular body 12 approximately one (1") inch in diameter at the cross-section of FIG. 3. The lure is approximately one (1") inch in height at the cross-section depicted in FIG. 4 and tapers in the rear back portion 20 to point 32. The body 12 is seven (7") inches long and the tuck 38 is two and a quarter (2$\frac{1}{4}$") inches from the front cleat 22. The front head portion 18 begins at a point proximate to front cleat 22 and expands in a gradually enlarging circle until the approximate position of the cross-section of FIG. 3 is reached. At that point the body becomes tubular to a point just aft of tuck 38. At a point just aft of tuck 38 the bottom belly portion 16 begins to form a point along curve 42. The body 12 begins to taper to a rear point 32 approximately two (2") inches from the end of rear tail portion 20, i.e. point 32.

In operation, the angle of diving plate 36 in combination with the curve of top back portion 14 in a plane parallel to the axis of the body 12 causes the lure to dive and porpose in a wave-like fish attracting manner. The tuck 38 facilitates this motion. The rudder-like rear portion of bottom belly portion 16 along curve 42 stabilizes the action of the lure and tighten its oscillations so that the lure acts like a startled or frightened fish which is attempting to flee from a predator. The rudder-like action of curve 42 along the bottom belly portion 16 allows the lure to stabilize track along a controlled path to approximate the action of a bait fish and aids in preventing the lure from tangling with other lures which might be trolled in close proximity.

The foregoing disclosure and description of the invention are illustrative and explanatory and various changes in size, shape and materials as well as in the details of the illustrated construction may be made without departing from the spirit of the invention. All such changes in variations are contemplated as falling within the scope of the appended claims.

I claim:
1. An artificial fishing lure comprising:
  a. an elongated tubular body having a front head portion, a rear tail portion, a bottom belly portion and a top back portion;
  b. a forward hook assembly connected to the bottom belly portion and a rear hook assembly connected to the rear tail portion;
  c. the top back portion forming a curved arc extending upwardly between the end portions, the apex of the arc positioned adjacent the forward hook assembly;
  d. the bottom belly portion having a tapered cross-section that forms a V-shape near the rear portion of the body generally between the hook assemblies, the bottom belly being rounded near the front head portion, generally forward of the front hook assembly;
  e. the bottom belly portion defining two longitudinally curved, downwardly extending arcuate surfaces that are positioned respectively fore and aft the forward hook assembly; and
  f. a diving plate attached to the front of the body extending forwardly thereof.

2. The lure of claim 1, in which the forward arcuate surface of the bottom belly portion has a radius of curvature which is smaller than the radius of curvature of the rear arc section of the bottom belly portion, and both of said curvatures being smaller than the radius of curvature of the top back portion.

3. The lure of claim 1, in which the diving plate is approximately as wide as the width of the body, and is approximately one-fifth (1/5) as long as the length of the body.

4. The lure of claim 1, in which the diving plate forms a curve which is generally parallel to the curve formed by the top back portion of the body.

5. The lure of claim 1, in which the V-shaped bottom belly portion extends along the length of the lure from at least the mid-point of the belly portion toward the rear tail portion of the lure.

6. The lure of claim 5, in which the rounded belly portion in cross-section extends along the length of the body from the front of the body to a point approximately one-third of the length of the body toward the rear of the body.

7. The lure of claim 1, in which the two curved downwardly extending arcuate surfaces forming the bottom belly portion of the body intersect to form an indentation in the bottom belly portion of the lure, said indentation being located at a point along the length of the body which is approximately one-third of the length of the body from the front head portion of the body toward the rear tail portion of the body.

8. The lure of claim 7, in which the front head portion forms a front tip and the rear tail portion forms a rear tip, and in which the curved arc of the top back portion and the curved arcuate surfaces of the bottom belly portion combine with the elongated tubular body to form a cross-sectional area about the indentation in which, with respect to a line drawn between the front tip and rear tip, two-thirds ($\frac{2}{3}$) of the cross-sectional area is above the line and one-third ($\frac{1}{3}$) of the cross-sectional area is below the line.

9. The lure of claim 7, in which the rear tail portion of the body tapers to a point as viewed from the rear of the lure.

10. The lure of claim 9, in which the top back portion is rounded in cross-section.

11. An artificial lure which maintains a controlled action and depth while being pulled through the water at velocities above 10 knots comprising:
 a. an elongated tubular body having a front head portion, a rear tail portion, a bottom belly portion and a top back portion;
 b. a rear hook assembly connected to the rear tail portion;
 c. a bottom belly portion defining two longitudinally curved, downwardly extending arcuate surfaces that intersect to form an indentation;
 d. the top back portion forming a curved arc extending upwardly between the end portions, the apex of the arc positioned vertically adjacent the indentation;
 e. the bottom belly portion having a tapered cross-section that forms a V-shape near the rear portion of the body generally between the hook assembly and the indentation, the bottom belly being rounded near the front head portion, generally forward of the indentation; and
 f. a diving plate attached to the front of the body extending forwardly thereof.

12. The lure of claim 11, in which the forward arcuate surface of the bottom belly portion has a radius of curvature which is smaller than the radius of curvature of the rear arcuate section of the bottom belly portion, both of said curvatures being smaller than the radius of curvature of the top back portion.

13. The lure of claim 11, in which a cleat for attaching the lure to a fishing line and the diving plate are connected to the front head portion at a point in the lower half of the frontal cross-section of the body.

* * * * *